United States Patent [19]

Sylvan et al.

[11] Patent Number: 5,572,573
[45] Date of Patent: Nov. 5, 1996

[54] REMOVABLE USER INTERFACE FOR USE WITH INTERACTIVE ELECTRONIC DEVICES

[75] Inventors: Loren M. Sylvan, Westminster; Adam N. Marx, Boulder, both of Colo.

[73] Assignee: U S West Advanced Technologies, Inc., Boulder, Colo.

[21] Appl. No.: 186,202

[22] Filed: Jan. 25, 1994

[51] Int. Cl.⁶ .............................. H04Q 7/32; G09G 5/00; G06F 7/00; H03K 17/94
[52] U.S. Cl. .............................. 379/61; 455/89; 345/173; 364/709.1; 341/23
[58] Field of Search .............................. 379/61, 58, 355, 379/52; 455/89, 90; 395/155, 156, 159, 161, 162; 345/173, 168, 169, 173, 174; 364/709.1, 709.11, 709.12, 709.13; 178/18, 19, 20; 341/20, 22, 23, 173

[56] References Cited

U.S. PATENT DOCUMENTS

| | | | |
|---|---|---|---|
| 4,870,677 | 9/1989 | Di Santo et al. | 379/355 |
| 4,885,580 | 12/1989 | Noto et al. | 341/23 |
| 4,908,845 | 3/1990 | Little | 379/52 |
| 5,059,960 | 10/1991 | Rosenberg et al. | 345/174 |
| 5,113,041 | 5/1992 | Blonder et al. | 178/18 |
| 5,223,677 | 6/1993 | Kapp et al. | 178/18 |
| 5,422,656 | 6/1995 | Allard et al. | 345/173 |

*Primary Examiner*—Curtis Kuntz
*Assistant Examiner*—Michael B. Chernoff
*Attorney, Agent, or Firm*—Brooks & Kushman

[57] ABSTRACT

An improved user interface for use in interactive electronic devices. The user interface eliminates the complexity and ambiguity problems encountered in conventional interfaces through the incorporation of a physical overlay designed for use in cooperation with a contiguous touch screen or a plurality of individual touch screens. The physical overlay delineates the touch screen or screens into a plurality of context sensitive task and information display regions which may be accessed by direct user manipulation.

10 Claims, 4 Drawing Sheets

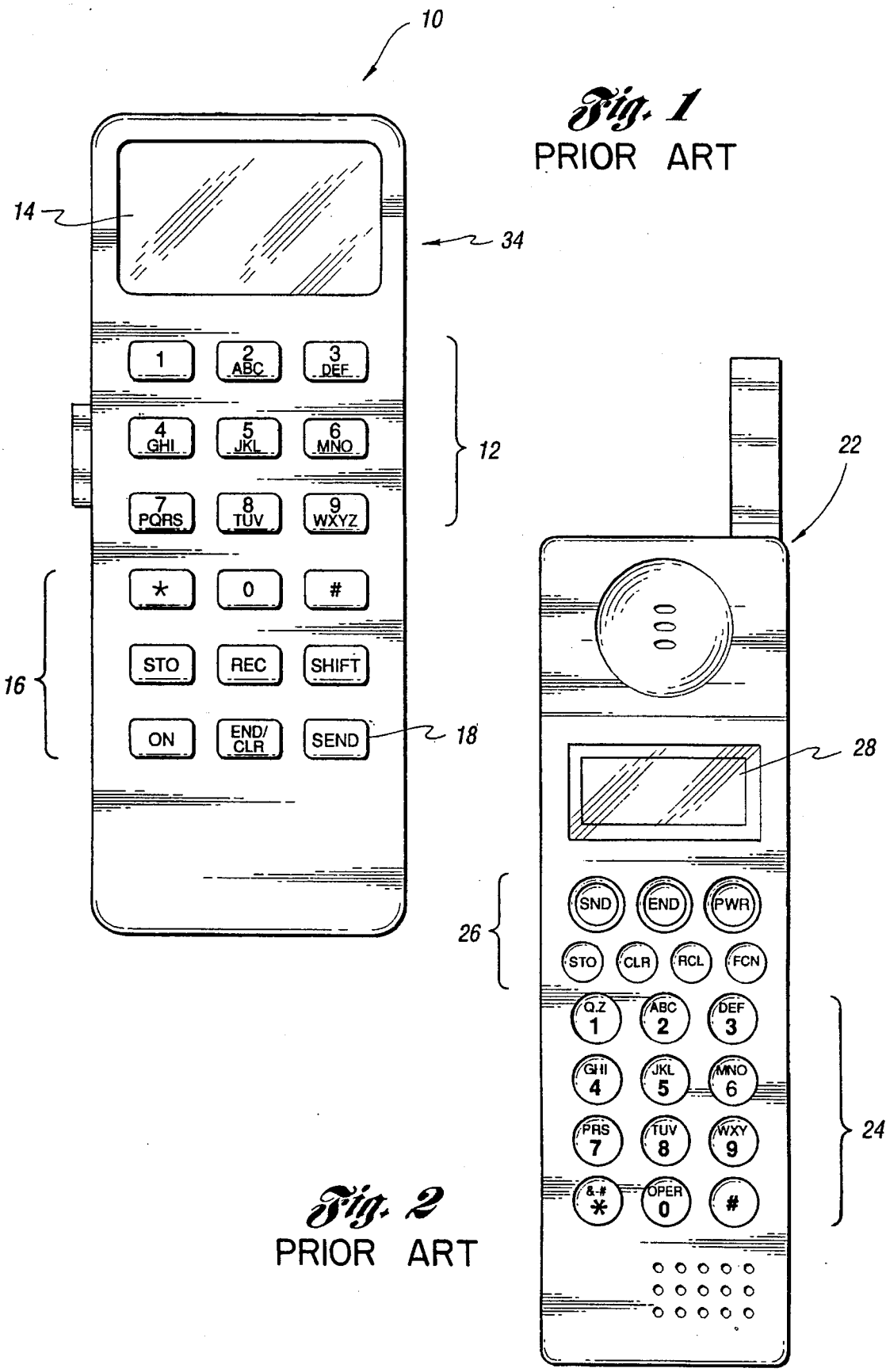

REMOVABLE USER INTERFACE FOR USE WITH INTERACTIVE ELECTRONIC DEVICES

TECHNICAL FIELD

The present invention relates to an improved user interface directed for use in interactive electronic devices which incorporate a physical overlay for precise disambiguation of touch screen input.

BACKGROUND ART

Conventional Customer Premises Equipment (CPE) devices, including desktop telephones, mobile and portable telephones, facsimile machines, Personal Digital Assistants (PDA's) and computers and related electronic devices such as video cassette recorders, televisions, remote controls, calculators and the like, present all information entry keys for all functions. Such keys are generally adapted for use in cooperation with a single visual display — regardless of whether the functions are relevant in the current context of the communication. Moreover, such visual displays which are generally liquid crystal displays (LCD's) do not present sufficient information to prevent users from entering an irrelevant or improper key. As a result, an erroneous key selection results in either an error message or similar indication that an invalid key has been entered — neither of which is desirable from a user standpoint.

In an effort by system designers to implement additional functions, conventional keyboards have further incorporated additional keys which again correspond to functions which are neither relevant nor operable in all communication contexts. As a result, the size as well as the complexity of such keyboards has been correspondingly increased. While efforts have been made to reduce this inherent complexity, these efforts have heretofore proven unsuccessful.

In the mobile telephone communications industry, for example, efforts have been made to minimize the number of entry keys while increasing the number of available features. Such efforts have involved the incorporation of entry keys which may be used to initiate multiple functions. In other applications, such as calculators and other electronic devices, as well as the aforementioned mobile telephones, <shift> keys have also been utilized. These multi-function entry keys have been designed to provide specific functions which are tied to particular communication contexts. This correspondence, however, is still neither readily apparent nor logically referenced. For example, many wireless communications devices, and in particular cellular telephones, i.e. wireless telephones operable in the microwave band between approximately 1.8 GHZ and 2.2 GHZ, utilize an entry key labeled <SEND> for use in both answering an incoming call as well as to originate an outgoing call. Similarly, many vehicular cellular telephones utilize a <CONTROL> button or entry key which may be used to store selected telephone numbers, lock the hand-set, adjust the volume of the received communication and initiate other selected operations.

Consider, for example, the conventional vehicular mobile telephone handset shown in FIG. 1 and designated generally by reference numeral 10. As shown, mobile telephone hand-set 10 includes a first class of fixed-label entry keys 12 disposed on the keypad for generating Dual-Tone Multi-Frequency (DTMF) signals (i.e. digits 0–9 plus the star and pound). Hand-set 10 further includes a single visual display 14 which, as referenced above, does not present detailed information sufficient to advise users from entering an irrelevant or incorrect key. Finally, hand-set 10 includes a second class of fixed label action keys 16, i.e. <STO>, <REC>, <SEND>, etc., for initiating selected functions. As further referenced above, the <SEND> key 18 is ambiguously operative for answering both incoming calls and for originating an outgoing call. A <CONTROL> key 20 operative to initiate a plurality of other functions such as locking the hand-set, increasing the volume, storing a desired telephone number and performing other selected operations is also provided. Vehicular mobile telephone hand-sets of this type provide ambiguous and imprecise functionality, are complicated to use and, as a result, are highly prone to user error.

As a further example, consider the prior art hand portable mobile telephone which is shown in FIG. 2 and designated generally by reference numeral 22. Portable telephone 22 is known to those skilled in the art as the NEC Model T300 portable phone. Like the prior art vehicular mobile telephone of FIG. 1, portable phone 22 includes a first class of fixed-label entry keys 24 for generating DTMF signals. Hand-set 22 further includes a second class of fixed-label action keys 26, i.e., <SEND>, <STO>, <RCL>, <FCN>, <CLR>, <END>, and <PWR> for initiating selected functions. Significantly, each of the fixed-label entry keys 24 and 26 are tied to a single visual display 28.

The most notable problem encountered in the operation of the above interactive electronic devices is that the required syntax is neither apparent nor consistent. In conventional mobile telephones, for example, storing a telephone number requires a three-step process, i.e. initiation of a store sequence, identification of a telephone number sought to be stored, and selection of a storage location. Similar steps are also required when storing interim calculations or numeric sequences on conventional calculators, remote controls, VCRs, etc.. These steps and their store sequences vary widely from manufacturer to manufacturer and from device to device. Yet, in most cases, little if any "on-line" or "during operation" help — other than an error message — is provided to guide the user through the required syntax.

In a further effort to minimize the number of entry keys while increasing the number of available features, interface designers and, in particular, the assignee of the present invention, U.S. West Advanced Technologies, Inc., has contemplated the incorporation of dynamic visual display screens in mobile and desktop telephones and related electronic devices. These "dynamic" visual display screens are designed to present to the user a plurality of context sensitive function labels. In operation, these function labels are adapted to be accessed by depressing one or more soft-label signaling keys which are provided in electrical communication with the dynamic visual display. See, for example, copending U.S. patent application Ser. No. 08/089,146 which is commonly owned by the assignee of the present invention.

As those skilled in the art will recognize, while the use of soft-label signaling keys presents a major advance over the prior art, this approach is nonetheless still limited in flexibility due to the inherent design requirement that items must be in specific places. In addition, the user is provided no direct manipulation or sensory feedback. In operation, the user must physically depress a button to access the corresponding desired function label, which subsequent testing has proven is less intuitive than direct manipulation of the label itself.

As the number of consumer electronic devices increases, interface designers have turned attention towards the employment of touch screens which, in contrast to the above devices, permit users to activate functions or to interact with information using direct manipulation. Such direct manipulation dramatically improves the ease-of-use of the interface, and thus increases the desirability of the device employing the interface. However, in contrast to the benefits derived from a direct manipulation interface via a touch screen, usability is simultaneously inhibited by the touch screen for the following reason. Due to the nature of the touch screen, users are apt to use their fingertips to activate/select items from the touch screen. Fingertips, however, are inexact pointing devices and thus generally unsuitable for such touch screens which require precise location of the finger press. Thus, the likelihood of activating the wrong function or selecting the wrong data is increased by the ambiguity of selections with the fingertip. This ambiguity actually inhibits the device's usability and thus its desirability.

Consequently, a need has therefore developed to provide an improved touch screen user interface which may be implemented in interactive electronic devices of the type referenced above. More specifically, a need has developed to provide such an improved interface wherein the function labels may be directly manipulated. Such an interface should also provide disambiguation means to guide the user to the appropriate function label while, at the same time, preventing the user from accessing an incorrect key.

DISCLOSURE OF THE INVENTION

It is therefore a principal object of the present invention to provide an improved user interface for use in interactive electronic devices which eliminates the complexity and ambiguity problems encountered in conventional interfaces yet provides a plurality of user-friendly functions.

A more specific object of the present invention is the provision of a user interface for use in interactive electronic devices which incorporates a single class of touch screen entry keys which function as context-sensitive task and information display regions which may be accessed by direct user manipulation.

Yet another object of the present invention is the provision of such an improved touch screen user interface which, through the use of raised overlay means, delineates the touch screen or screens into a plurality of precisely defined and easily accessible context-sensitive task and information display regions which guide the user to the appropriate region for direct user manipulated activation.

In carrying out the above objects and other objects, features and advantages of the present invention, there is provided a user interface adapted for use in interactive electronic devices including land-based telephones, wireless telephones, Personal Digital Assistants (PDA's) and computers, and VCRs, televisions, remote controls and the like which comprises a touch screen or a plurality of touch screens. The user interface further incorporates raised overlay means for delineating the touch screen or screens into a like plurality of context-sensitive task and information display regions. This overlay means, which may comprise, for example, a raised plastic card or similarly substantially rigid cover having appropriate windows or voids stamped therein is operable to guide the user to the appropriate task/information display region for direct user manipulated activation. As disclosed herein, these context-sensitive task and information display regions function as both soft-label signaling keys and as dynamic visual displays. In operation, the soft-label signalling keys provide direct access the displayed function labels relevant to the current context of the user interface.

The above objects and other objects, features, and advantages of the present invention are readily apparent from the following detailed description of the best modes for carrying out the invention when taken in connection with the accompanying drawings wherein like reference numerals are used for like components.

BRIEF DESCRIPTION OF THE DRAWINGS

FIG. 1 is a front plan view of a prior art vehicular mobile telephone hand-set;

FIG. 2 is a front plan view of a prior art hand portable mobile telephone;

BEST MODE FOR CARRYING OUT THE INVENTION

Figure 3:
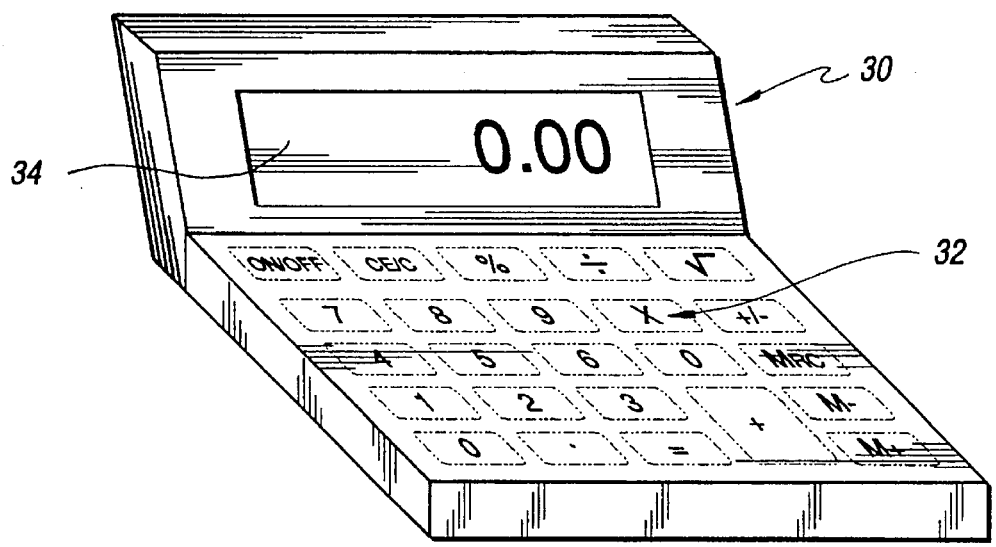
FIG. 3 is a perspective view of a prior art electronic device which incorporates touch screen entry keys.

Referring now to FIG. 3 of the drawings, a plurality of prior art touch screens which have been provided, for example, in a hand-held calculator 30 are shown and designated generally by reference numeral 32. As seen, these touch screen interfaces incorporate a single visual display 34 which provides output responsive to user initiated activity on touch screens 32. The disadvantage of these touch screen interfaces is that they are highly prone to error since a user may easily hit the wrong touch screen. The lack of any physical feedback further maximizes the possibility of user error.

Figure 4:
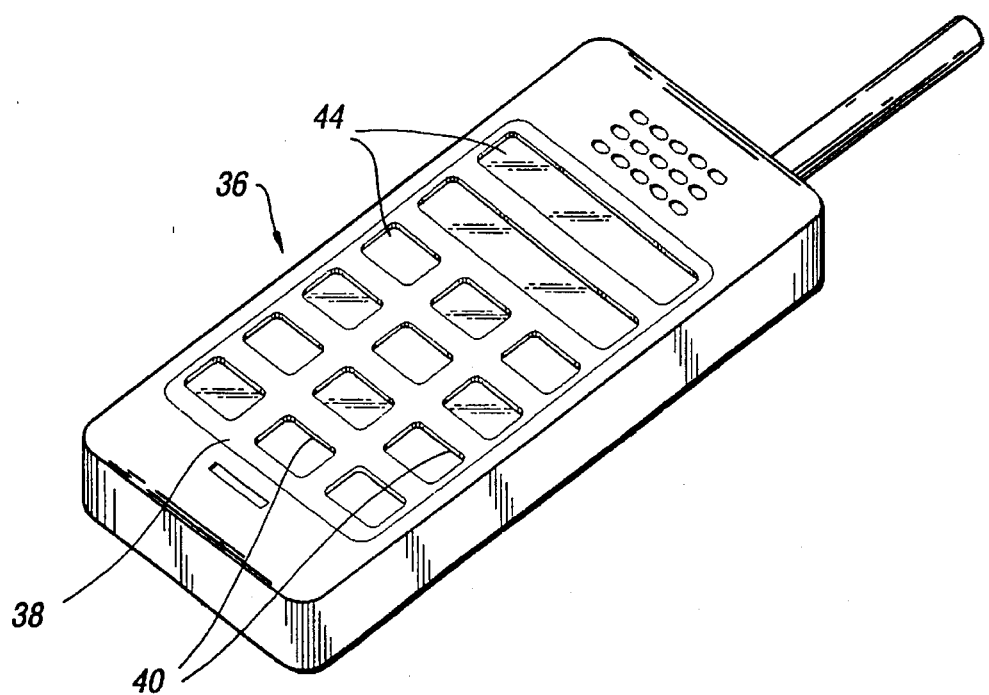
FIGS. 4–6 are schematic diagrams of the improved user interface of the present invention and the component parts thereof.
Figure 5:
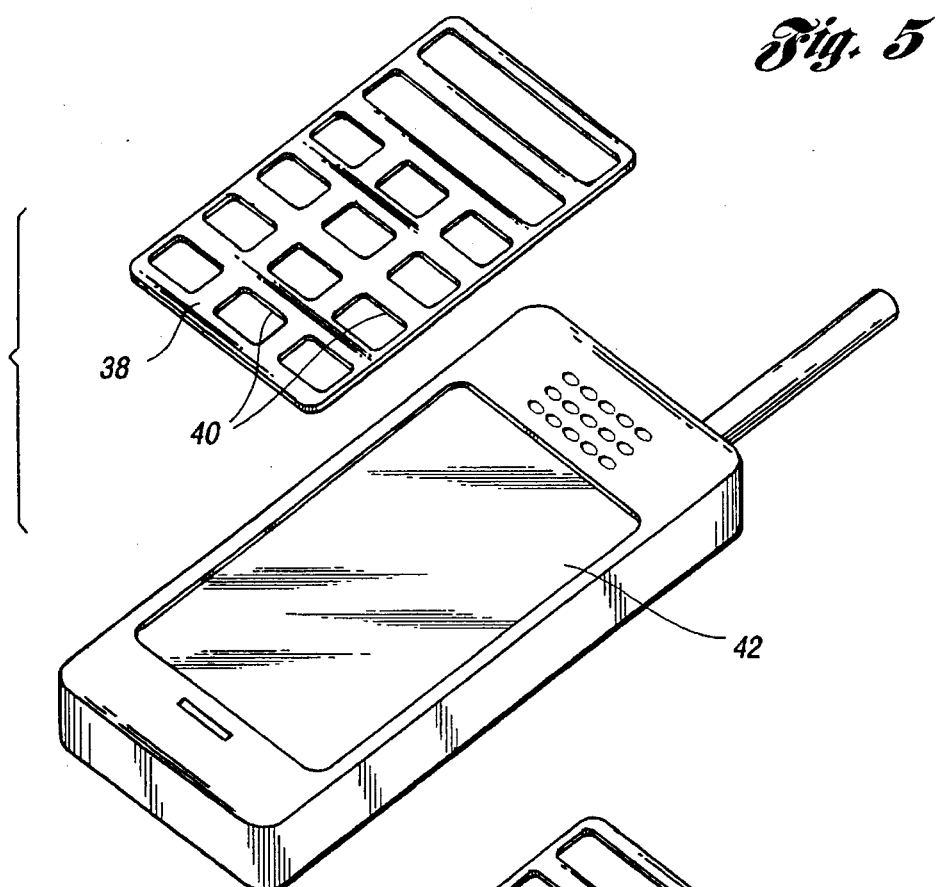
Figure 6:
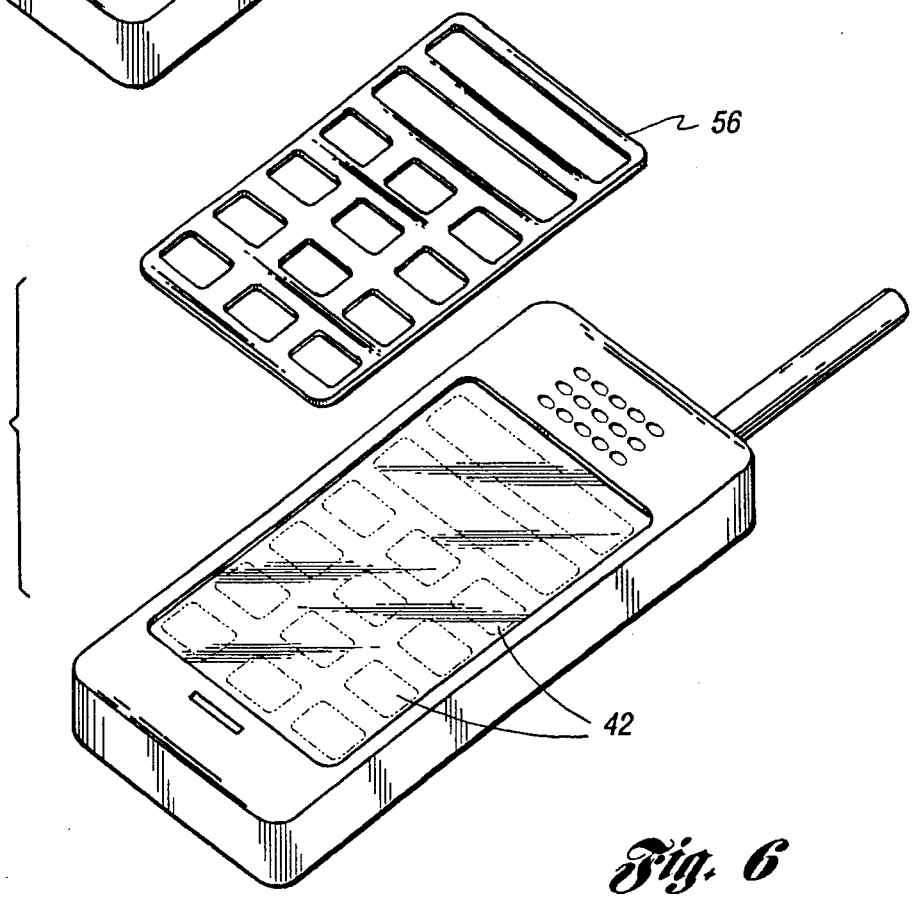

With reference now to FIGS. 4–6 of the drawings, the improved user interface incorporating the novel interactive touch screen interface of the present invention will be described in further detail. As shown, the interface of the present invention which is shown, by way of example, in a hand portable communications device such as a mobile telephone hand-set or Personal Digital Assistant (PDA) is designated generally by reference numeral 36. The interface necessarily incorporates physical overlay means such as substantially rigid plastic card 38. Card 38 is punched or stamped to define a plurality of voids or openings 40, which are of predetermined size, shape and location within card 38 and correspond to predetermined touch screen function labels.

As seen, by overlaying card 38 on touch screen or screens 42, a plurality of recessed information display and task regions 44 are defined which, in accordance with the invention described herein, are context sensitive and activated by direct user manipulation. Card 38 may be of any thickness sufficient to properly delineate the aforementioned task and information display regions 44 and guide the user to the desired region sought to be activated. As readily understood, however, the thinner the card 38 may be designed and implemented, the greater the reduction in corresponding material cost and vice-versa. Nonetheless, at both ends of the spectrum, a tradeoff exists with respect to the desired functionality of the overlay means. Thus, for example, if the card 38 is too thin, the user will be unable to properly physically distinguish the task and information display regions 44 and an erroneous region may be activated. Similarly, if the card 38 is too thick, the user will be inhibited from easily accessing the desired region.

Against this background, Applicants contemplate that a substantially rigid card having a thickness in the range of 0.5 mm to 2.5 mm should be sufficient for the involved user interfaces of most applications, including land-based telephones, mobile telephones, Personal Digital Assistants (PDAs) and computers, calculators and other electronic devices as referenced above. However, it is understood and contemplated by Applicants that the thickness as well as the size and flexibility of card 38 may, of course, vary depending upon the particular use of the same.

It is thus seen that the use of such an improved touch screen user interface provides maximum interface flexibility for use in a limited amount of real estate such as, for example, in the cellular telephone or PDA hand-set 36 which is shown. As readily seen, the improved user interface preserves flexibility of the touch screens 42 while adding the accuracy and physical feedback of soft-label signaling keys.

Figure 7:
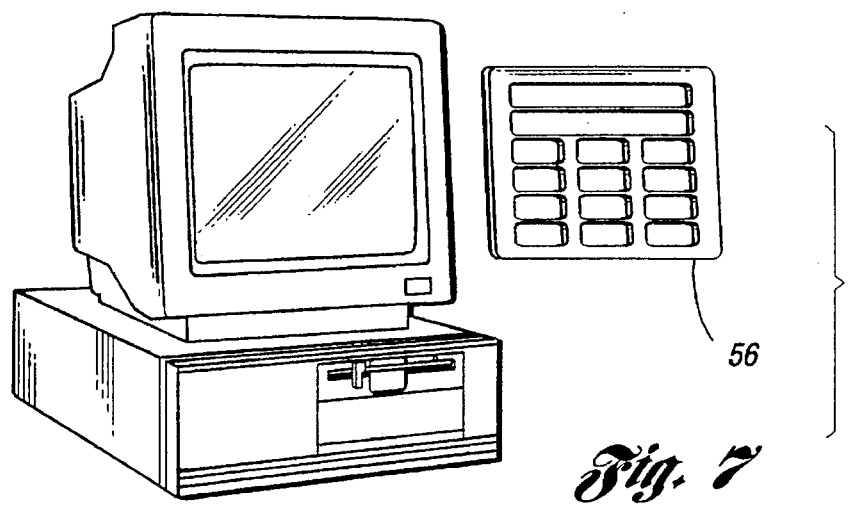
FIG. 7 is a schematic diagram of alternative embodiment of the improved user interface of the present invention.

As shown in FIG. 6 of the drawings, in an alternative embodiment, a contiguous touch screen need not be provided. Rather, a plurality of defined touch screens 42 may be used with their division made aesthetically more pleasing through the use of physical card overlay 38 referenced above. The physical card overlay 38 of the present invention may be used, in cooperation with any suitable interface including, for example, the personal computer as further shown in FIG. 7 whether a contiguous touch screen or a plurality of defined touch screens are utilized.

As readily seen, the user interface of the present invention which incorporates a touch screen combined with a physical overlay serves to delineate regions of the touch screen that are both programmable, yet easily recognizable and simple to identify and activate. The raised overlay 38 guides the user's fingers to the appropriate soft key region, thus reducing ambiguity and error while preserving programmable flexibility.

Operation

Figure 8:
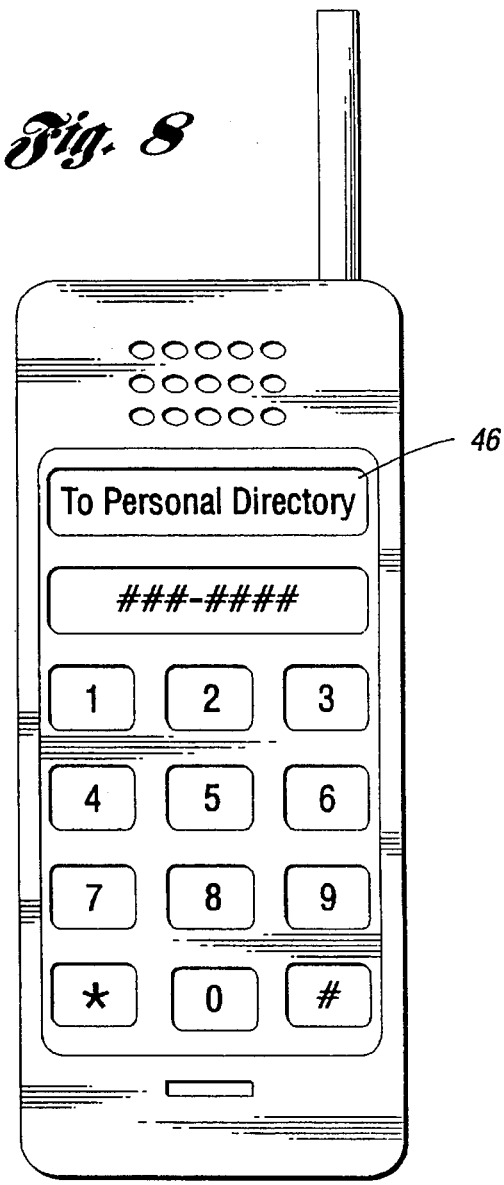
FIGS. 8 and 9 are schematic diagrams illustrating the operation of the improved user interface of the present invention.
Figure 9:
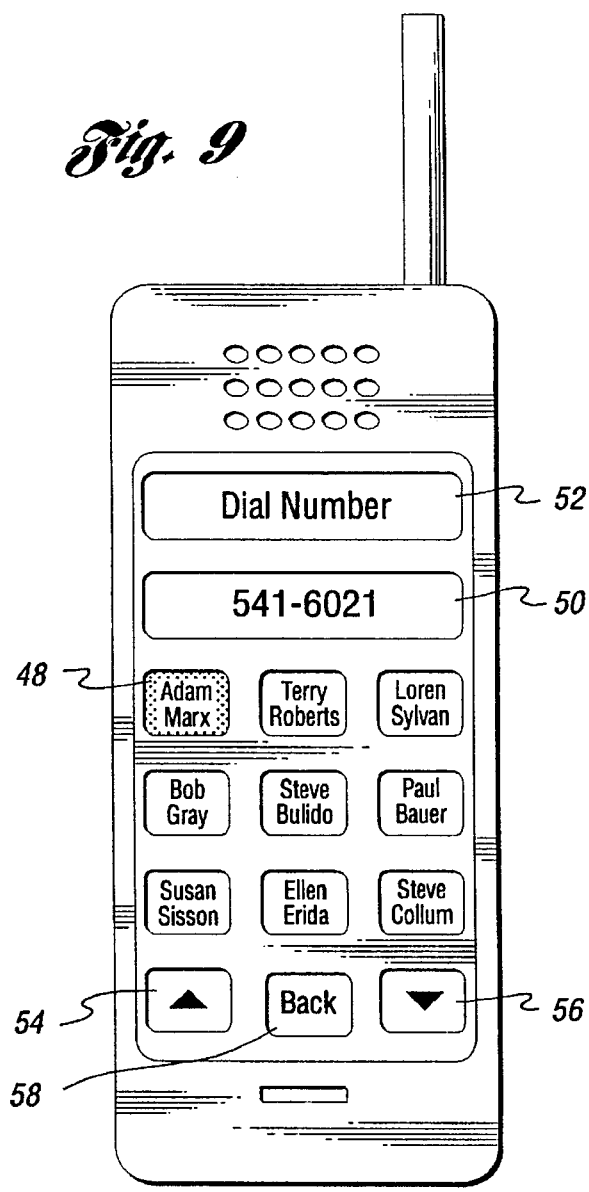

Turning now to FIGS. 8–9 of the drawings, the operation of the improved user interface of the present invention will be described in further detail. Consider, for example, the user interface provided in a hand-held wireless telephone wherein a user desires to select from many stored telephone numbers provided in a "personal directory" and to dial a selected telephone number. As shown in FIG. 8, the user may physically depress task region 46 < to personal directory >whereupon the display regions will dynamically accommodate the current context of the communication and prompt the user with a plurality of recipients and their corresponding telephone numbers which have been stored in the personal directory as shown in FIG. 9. Should the user thereafter desire to send a communication to "Adam Marx," for example, the user need only physically depress task/ display region 48 whereupon the corresponding telephone number will appear in display region 50 <541–6021>. The user may then originate the telephone call by physically depressing display region 52 <dial number>.

As readily seen, <up> and <down> keys may also be provided as shown in display regions 54 and 56 as well as a <back> key provided in display region 58. If any of regions 54, 56 or 58 are activated, the corresponding display of regions will change accordingly and prompt the user to select from additionally stored entries.

The improved user interface of the present invention which incorporates a touch screen or screens delineated by raised overlay means such as rigid plastic card 38 provides context-sensitive task and information display regions which may be used in a number of communication devices including hand-held telephones shown by way of example above as well as personal computers, PDAs, calculators and other suitable interactive electronic devices. The direct user manipulation provided for by the present invention greatly reduces user error by providing explicit instructions for the user and eliminating the aforementioned ambiguity problems encountered with shift keys, soft-label signaling keys and the like.

While the best modes for carrying out the invention have been described in detail, those familiar with the art to which this invention relates will recognize various alternative designs and embodiments for practicing the invention as defined by the following claims.

What is claimed is:

1. For use with an interactive electronic device, a user interface, comprising:

a touch screen having a plurality of predetermined function labels; and a raised overlay supported by the touch screen having a plurality of apertures of predetermined size, shape and location corresponding to the predetermined plurality of touch screen function labels, the plurality of apertures for delineating said plurality of touch screen function labels into a plurality of context-sensitive task and information display regions and guiding the user to the appropriate region for direct user manipulated activation.

2. A user interface as in claim 1 wherein the raised overlay is a substantially rigid card having a predetermined thickness.

3. A user interface as in claim 2 wherein the predetermined thickness is in the range of 0.5 mm to 2.5 mm.

4. For use with an interactive electronic device, a user interface, comprising:

a plurality of touch screens; and a raised overlay supported by the touch screen having a plurality of apertures of predetermined size, shape and location corresponding to the predetermined plurality of touch screen function labels, the plurality of apertures for more precisely delineating said plurality of touch screen function labels so as to define a like plurality of context-sensitive task and information display regions and guiding the user to the appropriate region for direct user manipulated activation.

5. A user interface as in claim 1 wherein the interactive electronic device is a telephone.

6. A user interface as in claim 1 wherein the interactive electronic device is a mobile telephone hand-set.

7. A user interface as in claim 1 wherein the interactive electronic device is a calculator.

8. A user interface as in claim 1 wherein the interactive electronic device is a personal computer.

9. A user interface as in claim 1 wherein the interactive electronic device is a Personal Digital Assistant.

10. A mobile telephone hand-set, comprising:

an earpiece;

a mouthpiece;

a touch screen having a plurality of predetermined function labels; and a raised overlay supported by the touch screen having a plurality of apertures of predetermined size, shape and location corresponding to the predetermined plurality of touch screen function labels, the plurality of apertures for delineating said plurality of touch screen function labels into a plurality of context-sensitive task and information display regions and guiding the user to the appropriate region for direct user manipulated activation.

* * * * *